(12) United States Patent
Kim et al.

(10) Patent No.: US 10,338,094 B2
(45) Date of Patent: Jul. 2, 2019

(54) PRETREATMENT APPARATUS AND METHOD OF WHEEL SPEED

(71) Applicant: Hyundai Autron Co., Ltd., Seongnam-si (KR)

(72) Inventors: Tae-Hun Kim, Yongin-si (KR); Seung-Hwan Shin, Gwangmyeong-si (KR); Byung-Koo Choi, Anyang-si (KR); Young-Taek Cho, Seoul (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 545 days.

(21) Appl. No.: 14/553,850

(22) Filed: Nov. 25, 2014

(65) Prior Publication Data

US 2015/0177274 A1    Jun. 25, 2015

(30) Foreign Application Priority Data

Dec. 19, 2013 (KR) .................. 10-2013-0159038

(51) Int. Cl.
| | |
|---|---|
| *G01C 17/38* | (2006.01) |
| *G01P 21/00* | (2006.01) |
| *G01L 17/00* | (2006.01) |
| *G01M 17/02* | (2006.01) |
| *G01P 3/48* | (2006.01) |
| *G01P 3/487* | (2006.01) |
| *G01P 21/02* | (2006.01) |
| *G01D 5/14* | (2006.01) |

(Continued)

(52) U.S. Cl.
CPC ............ *G01P 21/00* (2013.01); *B60C 23/061* (2013.01); *G01D 5/145* (2013.01); *G01D 5/2448* (2013.01); *G01L 17/00* (2013.01); *G01M 17/02* (2013.01); *G01P 3/48* (2013.01); *G01P 3/487* (2013.01); *G01P 21/02* (2013.01)

(58) Field of Classification Search
CPC ....... G01P 21/00; B06C 23/061; G01D 5/145; G01D 5/2448; G01L 17/00; G01M 17/02
USPC ..................................... 370/310–350; 702/96
See application file for complete search history.

(56) References Cited

U.S. PATENT DOCUMENTS

| | | | |
|---|---|---|---|
| 7,240,542 B2 | 7/2007 | Gustafsson et al. | |
| 8,948,967 B2 * | 2/2015 | Championnet | ........... G01P 3/44 |
| | | | 116/34 R |

(Continued)

FOREIGN PATENT DOCUMENTS

| | | |
|---|---|---|
| CN | 103095259 A | 5/2013 |
| DE | 44 09 846 A1 | 9/1994 |

(Continued)

OTHER PUBLICATIONS

Korea Intellectual Property Office, Office Action for Korean Patent Application No. 10-2013-0159038, dated Mar. 25, 2015.

(Continued)

*Primary Examiner* — Huan Hoang
(74) *Attorney, Agent, or Firm* — Baker & Hostetler LLP (57) ABSTRACT

An apparatus for pretreating a wheel speed includes a tone wheel having a plurality of teeth, a hall sensor configured to detect a measurement angle including an offset of each of the teeth, an offset correcting unit configured to correct the measurement angle with a corrective offset when disturbance is generated and a frequency estimating unit configured to estimate a frequency based on a result value calculated from the offset correcting unit.

4 Claims, 9 Drawing Sheets

(51) Int. Cl.
*G01D 5/244* (2006.01)
*B60C 23/06* (2006.01)

(56) References Cited

U.S. PATENT DOCUMENTS

| | | | |
|---|---|---|---|
| 2007/0100531 A1* | 5/2007 | Kim | B60C 23/0408 701/71 |
| 2010/0217542 A1* | 8/2010 | Fujita | G01P 3/489 702/50 |
| 2011/0107828 A1* | 5/2011 | Kawasaki | B60C 23/061 73/146.2 |
| 2011/0282546 A1* | 11/2011 | Heo | B60C 23/0416 701/36 |
| 2013/0104640 A1* | 5/2013 | Gotschlich | B60C 23/062 73/146.5 |
| 2014/0130590 A1* | 5/2014 | Nomura | G01M 17/02 73/146 |
| 2014/0379291 A1* | 12/2014 | Mori | B60C 23/0416 702/138 |

FOREIGN PATENT DOCUMENTS

| | | |
|---|---|---|
| DE | 197 47 918 A1 | 3/1999 |
| DE | 60 2004 013 044 T2 | 5/2009 |
| JP | 63-305011 | 12/1988 |
| JP | 08-034215 A | 2/1996 |
| KR | 10-1172377 B | 8/2012 |
| KR | 10-1334233 | 11/2013 |

OTHER PUBLICATIONS

Deutsches Patent—und Markenamt, Office Action for German Patent Application No. 10 2014 117 852.1, dated May 11, 2015.

\* cited by examiner

Ideal case

PRETREATMENT APPARATUS AND METHOD OF WHEEL SPEED

CROSS-REFERENCE TO RELATED APPLICATIONS

This application claims priority to and the benefit of Korean Patent Application No. 10-2013-0159038 filed in the Korean Intellectual Property Office on Dec. 19, 2013, the entire contents of which are incorporated herein by reference.

TECHNICAL FIELD

The present invention relates to a method of pretreating a wheel speed. More particularly, the present invention relates to a method of pretreating a wheel speed, which improves accuracy in estimating a frequency by correcting a detection error of a wheel sensor caused by disturbance at the time air pressure of a tire is estimated from a signal generated by a wheel speed sensor.

BACKGROUND ART

Recently, a tire pressure monitoring system (TPMS), which detects a decrease in air pressure of a tire mounted in a vehicle, and notifies a driver of the decrease in air pressure, has been mounted in the vehicle.

When air pressure of a tire is low, there is a possibility that a vehicle easily slides, which may cause a big accident, the amount of fuel consumption is increased, so that fuel efficiency deteriorates, a lifespan of a tire becomes short, and riding comfort and braking power are considerably decreased.

The TPMS notifies a driver of a drop of pressure of a tire, and makes the driver check a pressure state of the tire, thereby preventing the aforementioned problem.

The TPMS is divided into a direct scheme TPMS for directly measuring a decrease in pressure of a tire, and an indirect scheme TPMS for indirectly measuring a decrease in pressure of a tire by using a wheel speed.

In the direct scheme TPMS, a pressure sensor attached to a tire notifies a driver of a change in air pressure of the tire. The indirect scheme TPMS indirectly estimates a change in air pressure of a tire through a change in a response characteristic (for example, a rotation speed, or a frequency characteristic of a rotation speed) of the tire generated when air pressure is decreased, and notifies a driver of a result of the estimation.

The indirect scheme TPMS may be classified into a dynamic loaded radius (DLR) analysis scheme, and a resonance frequency method (RFM) analysis scheme. The DLR analysis scheme and the RFM analysis scheme will be abbreviated as a radius analysis and a frequency analysis, respectively.

The frequency analysis adopts a scheme of, when air pressure of a tire is decreased, detecting a difference between a tire with normal air pressure and a tire with the decreased air pressure by using a change in a frequency characteristic of a rotation speed signal of a wheel. In the frequency analysis, taking notice of a resonant frequency obtainable by the frequency analysis of the rotation speed signal of the wheel, when the resonant frequency is calculated to be lower than a reference of frequency estimated during initialization, it is determined that the air pressure of the tire is decreased.

The radius analysis adopts a scheme of detecting a decrease in air pressure by comparing rotation speeds of four tires by using a phenomenon in which a dynamic loaded radius of a tire with decreased air pressure is decreased during travelling, and as a result, the tire with the decreased air pressure rotates faster than a tire with normal air pressure (see Japanese Patent Application Laid-Open No. 1988-305011).

However, the direct scheme TPMS has a problem in that an additional component for measuring pressure of a tire is further required, so that a configuration becomes complex, and manufacturing costs increase. Accordingly, the indirect scheme TPMS is used.

Particularly, the indirect scheme TPMS mainly estimates air pressure of a tire based on a wheel sensor signal of an anti-lock braking system (ABS) or an electronic controlled suspension (ECS).

The wheel sensor of the ABS or the ECS generates a speed signal by using a tone wheel and a hall sensor. The tone wheel is a mechanical structure generated by a sintering method, and generally has about 47 to 49 teeth while rotating one round.

Figure 1:
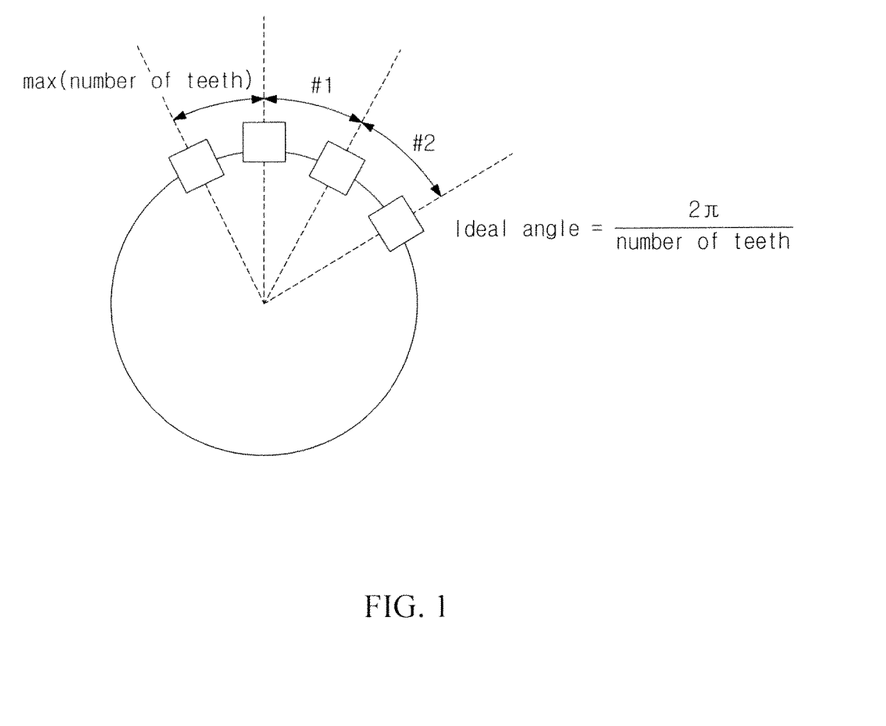
FIG. 1 is a diagram illustrating an ideal angle of each tooth of a tone wheel.

Referring to FIG. 1, an ideal angle between the teeth may be calculated as $2\pi/N$. Here, N indicates the total number of teeth.

However, in actual, in a measurement angle between the teeth, an angle error is added to the ideal angle due to a processing error and the like. That is, the angle error may be calculated by a difference between the measurement angle and the ideal angle.

However, even though the angle error is included, an angle for one rotation of the tone wheel is constant with 360°, and the sum of the respective angle errors for one rotation is 0.

Figure 2A:
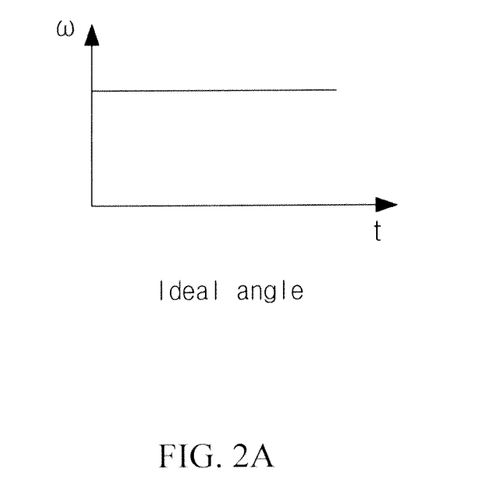
FIGS. 2A and 2B are diagrams illustrating frequency estimation results at the same angular speed of a wheel according to existence/non-existence of an angle error.
Figure 2B:
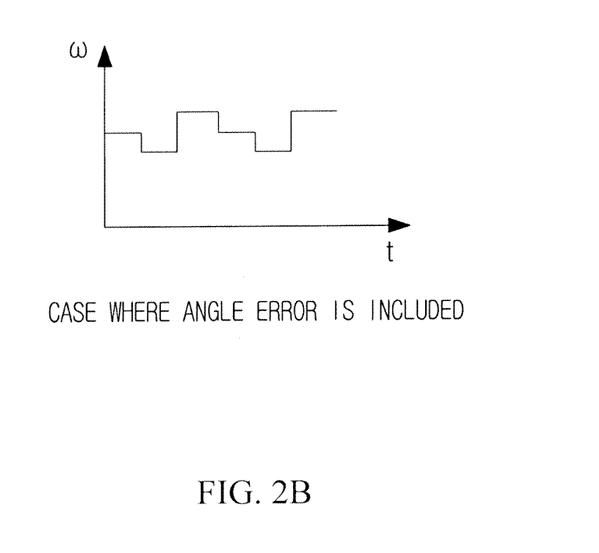

However, as illustrated in FIG. 2, when an measurement error, or disturbance, such as mechanical impact, is applied, when an angle is measured, the sum of the angle errors is not 0. In this case, when a frequency is estimated, it is impossible to accurately estimate a frequency by disturbance.

Accordingly, since a value measured by the wheel sensor is not accurate, there is a problem in that t is difficult to accurately estimate air pressure of a tire.

RELATED ART LITERATURE

Korean Patent No. 10-1334233

SUMMARY OF THE INVENTION

The present invention has been made in an effort to provide an apparatus and a method of pretreating a wheel speed, which are capable of improving accuracy in estimating a frequency by decreasing a tooth error of a speed signal detected by a wheel sensor and transmitted when disturbance is generated.

An exemplary embodiment of the present invention provides an apparatus for pretreating a wheel speed. The apparatus includes a tone wheel having a plurality of teeth, a hall sensor configured to detect a measurement angle including an offset of each of the teeth, an offset correcting unit configured to correct the measurement angle with a corrective offset when disturbance is generated and a frequency estimating unit configured to estimate a frequency based on a result value calculated from the offset correcting unit.

The corrective offset is calculated by dividing a sum of the offset by the number of the teeth.

Another exemplary embodiment of the present invention provides a method of pretreating a wheel speed. The method includes the steps of (a) detecting teeth of a tone wheel by using a hall sensor, and obtaining a measurement angle including an offset; (b) calculating a corrective offset when disturbance is generated; (c) correcting the measurement angle by using the calculated corrective offset; and (d) estimating a frequency based on a result value calculated in step (c).

The corrective offset is calculated by dividing a sum of the offset by the number of the teeth.

The apparatus and the method of pretreating a wheel speed according to the exemplary embodiments of the present invention improve accuracy in estimating a frequency by using a corrective offset when disturbance is generated.

The apparatus and the method of pretreating a wheel speed according to the exemplary embodiments of the present invention improve accuracy in estimating a frequency by dividing an offset generated by disturbance by the total number of teeth, and then adding or subtracting the calculated offset to or from a measurement angle of each of the teeth.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. The terms used in the following description are defined considering the functions of the present invention and may vary depending on the intention or usual practice of a designer or manufacturer. Therefore, the definitions should be made based on the entire contents of the present specification. Parts indicated by like reference numerals (reference numbers) refer to like elements throughout the specification.

Hereinafter, a wheel speed pretreatment apparatus and method according to an exemplary embodiment of the present invention will be described.

Figure 3:
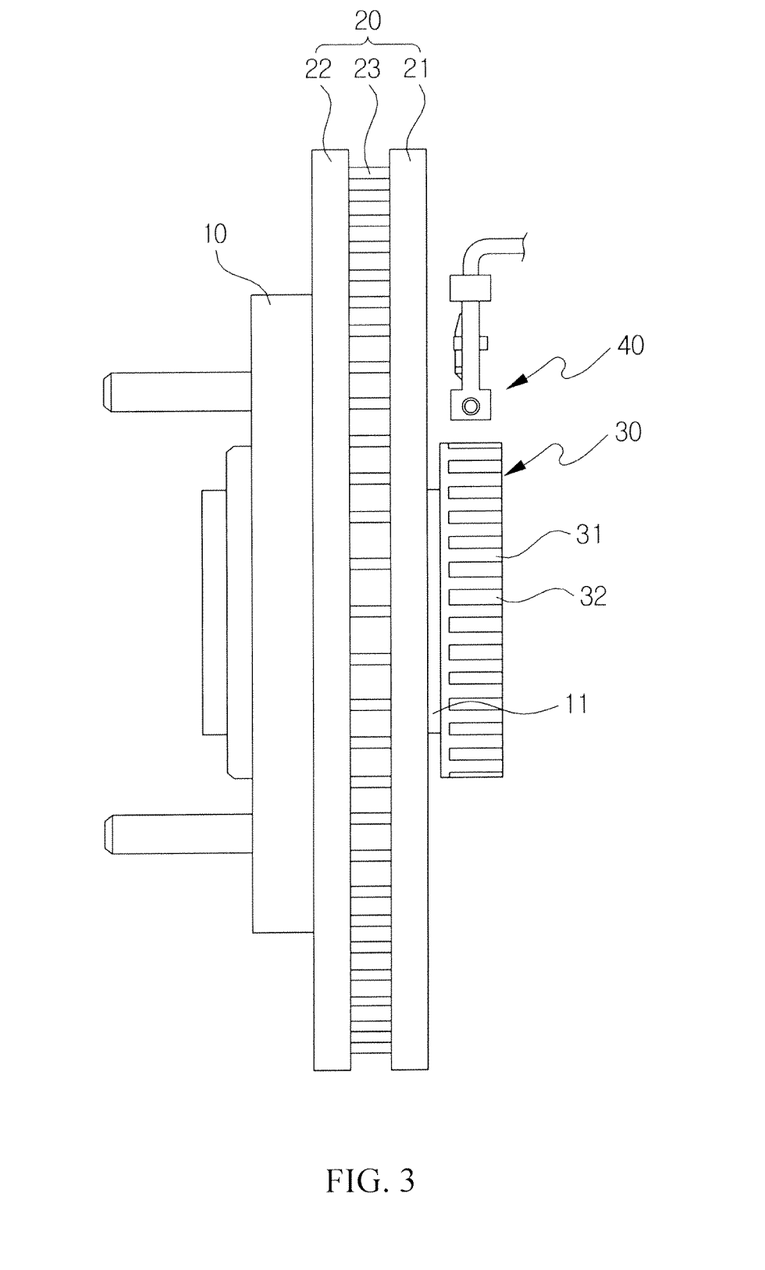
FIGS. 3 and 4 are diagrams illustrating a wheel speed pretreatment apparatus according to an exemplary embodiment of the present invention.

As illustrated in FIG. 3, a vehicle may include a disk 20 which is mounted in a hub 10 coupled to a wheel (not illustrated) and is rotated together with the hub 10. Here, in the disk 20, an internal plate 21 and an external plate 22 may be integrally formed by a rib 23 which is radially formed therebetween.

The vehicle may include a tone wheel 30 which is coupled to a wheel shaft 11, which penetrates the disk 20, and is rotated together when the disk 20 is rotated, and a hall sensor 40, which is proximately installed to the tone wheel 30, and detects the tone wheel 30 and generates a speed signal.

Here, the tone wheel 30 is formed to have an appearance in which a sawtooth shape including a plurality of teeth 31 and a plurality of valleys 32 is repeatedly formed on an outer peripheral surface shaped like a disk.

The hall sensor 40 generates a speed signal by using a frequency generated according to a rotation of the tone wheel 30.

Figure 4:
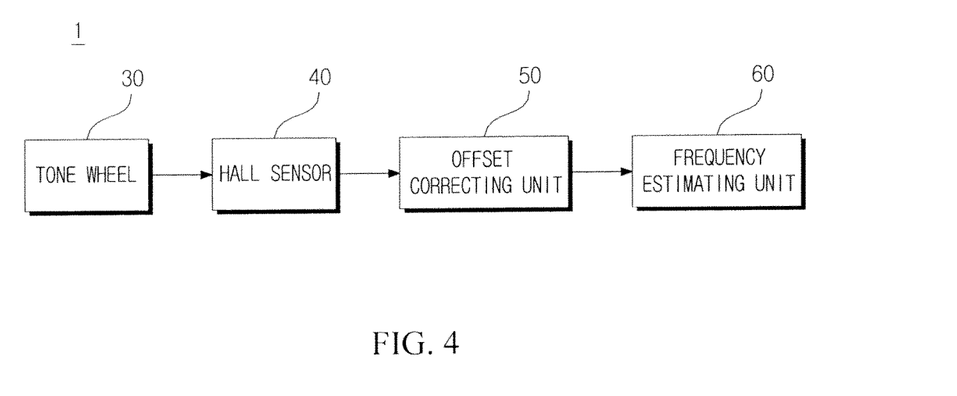

As illustrated in FIGS. 3 and 4, the wheel speed pretreatment apparatus according to the exemplary embodiment of the present invention may include the tone wheel 30, the hall sensor 40, an offset correcting unit 50, and a frequency estimating unit 60.

Figure 5:
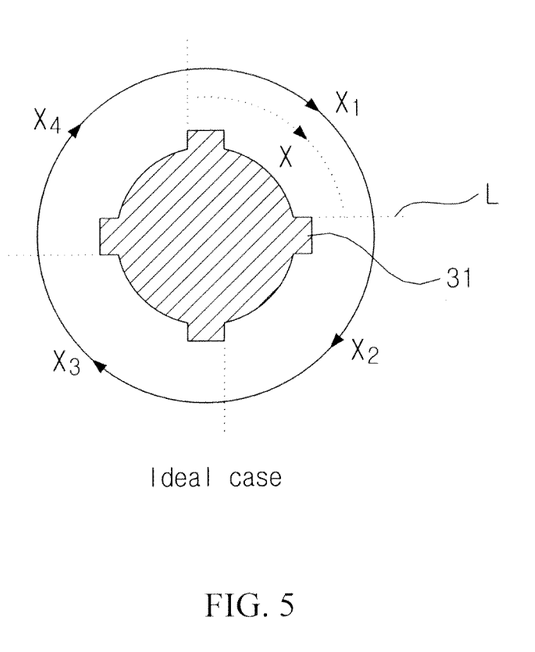
FIG. 5 is a diagram illustrating an ideal case of a tone wheel of the wheel speed pretreatment apparatus according to the exemplary embodiment of the present invention.

Referring to FIG. 5, for the tone wheel 30 provided with four teeth 31, an entire angle is 4X during one rotation. Here, X indicates an ideal angle between the teeth 31. In FIG. 5, X is illustrated based on a virtual line L.

Figure 6:
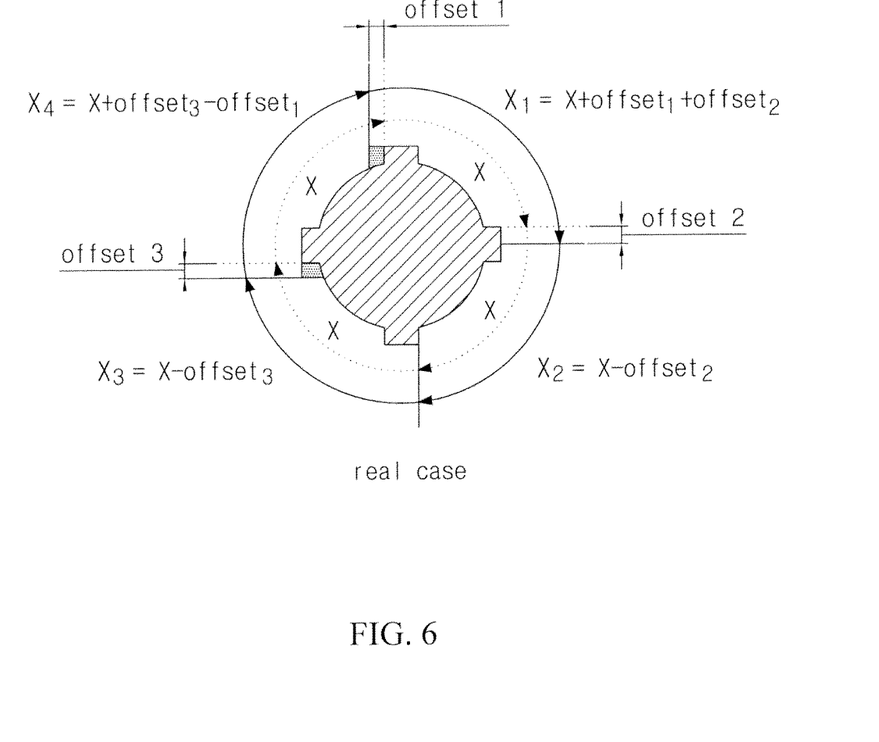
FIG. 6 is a diagram illustrating a real case of a tone wheel of the wheel speed pretreatment apparatus according to the exemplary embodiment of the present invention.

However, referring to FIG. 6, in actual, for each tone wheel 31, $X_1 = X + \text{offset}_1 + \text{offset}_2$, $X_2 = X - \text{offset}_2$, $X_3 = X - \text{offset}_3$, and $X_4 = X + \text{offset}_3 - \text{offset}_1$, which are measurement angles, are detected. That is, an offset may exist between the teeth 31.

However, since $X_1 + X_2 + X_3 + X_4 = 4X$, the measurement angles have the same entire angle during one rotation.

Accordingly, as expressed by Equation 1 below, it is possible to calculate a corrective offset by dividing the sum of offsets by the number N of teeth 31.

$$\text{correctiveOffset} = \frac{\sum \text{offset}}{\text{number of teeth}} \quad \text{[Equation 1]}$$

Accordingly, when there is no distortion caused by disturbance, a value of the corrective offset may be 0.

However, when there is a value of the corrective offset, this is determined as an influence caused by disturbance, and an angle error is corrected with the corrective offset.

That is, when it is impossible to accurately estimate a frequency by disturbance, the offset correcting unit 50 of the wheel speed pretreatment apparatus 1 estimates a frequency by correcting the angle error with the correction offset.

Figure 7A:
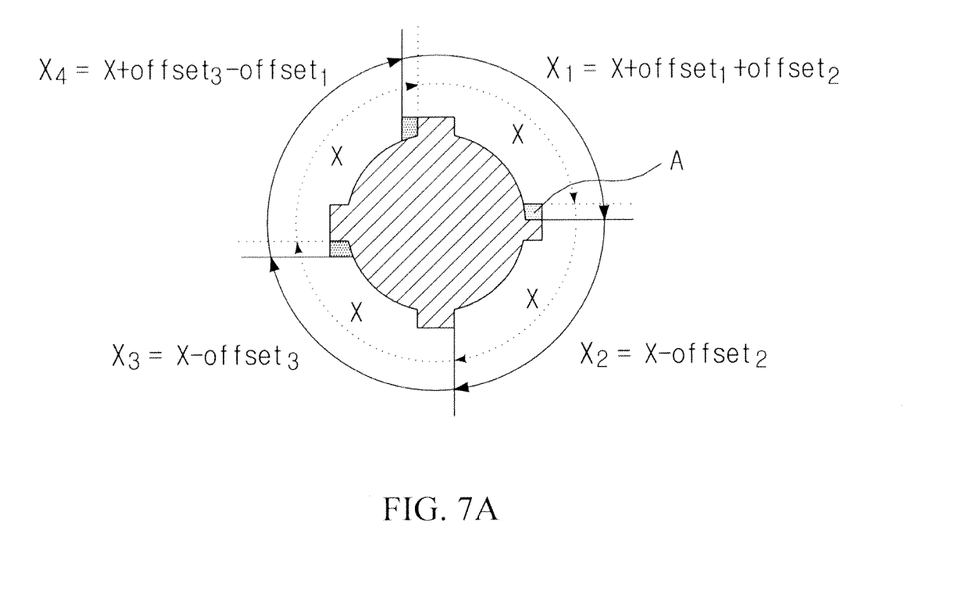
FIGS. 7A and 7B are diagrams illustrating a state before and after a correction by a corrective offset of the wheel speed pretreatment apparatus according to the exemplary embodiment of the present invention.
Figure 7B:
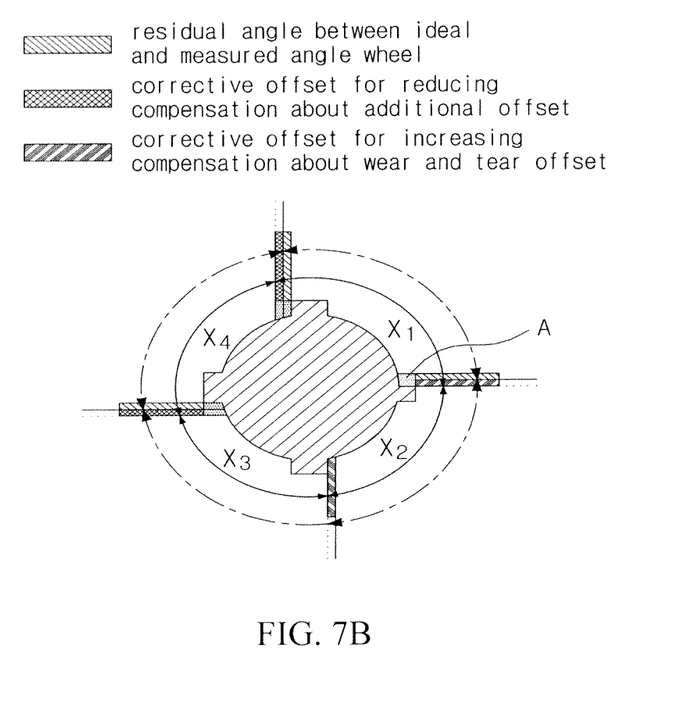

More particularly, referring to FIGS. 7A and 7B, when disturbance A is generated as illustrated in FIG. 7A, a value, other than 0, is obtained as the corrective offset.

Accordingly, as illustrated in FIG. 7B, the offset correcting unit 50 improves accuracy in estimating a frequency by adding the calculated corrective offset to the measurement angle.

That is, the offset correcting unit 50 improves accuracy in estimating a frequency by dividing the offset caused by disturbance by the total number of teeth 31, and then adding or subtracting the calculated offset to or from the measurement angle of each of the teeth 31.

In the meantime, the frequency estimating unit 60 may estimate a frequency with improved accuracy through a signal including a result value in which the measurement angle is corrected with the calculated corrective offset when disturbance is generated.

In the present invention, the case where the four teeth 31 are formed at the tone wheel 30 is described as an example, but the present invention is not essentially limited thereto, and a plurality of teeth 31 may be formed at the tone wheel 30 regardless of the number of teeth 31 as a matter of course.

Figure 8:
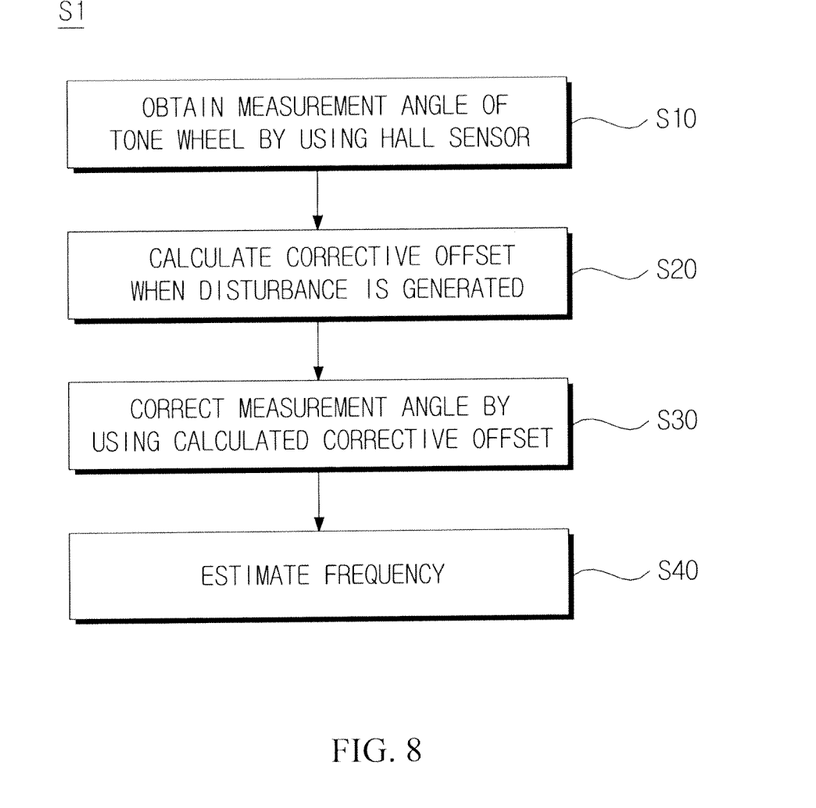
FIG. 8 is a diagram illustrating a wheel speed pretreatment method according to an exemplary embodiment of the present invention.

Hereinafter, a wheel speed pretreatment method S1 according to an exemplary embodiment of the present invention will be described with reference to FIG. 8.

The wheel speed pretreatment method S1 according to the exemplary embodiment of the present invention may include detecting the teeth 31 of the tone wheel 30 by using the hall sensor and obtaining a measurement angle including an offset (S10), calculating a corrective offset when disturbance is generated (S20), correcting the measurement angle by using the calculated corrective offset (S30), and estimating a frequency based on the result value calculated in operation S30 (S40).

In the detecting of the teeth 31 of the tone wheel 30 by using the hall sensor and the obtaining of the measurement angle including the offset (S10), the teeth 31 of the tone wheel 30 are detected by using the hall sensor 40, and measurement angles $X_1$, $X_2$, $X_3$, and $X_4$ including the offset are detected as illustrated in FIG. 6.

When the disturbance is generated, in the calculating of the corrective offset (S20), the corrective offset is calculated by Equation 1, in which the sum of the offsets is divided by the number of teeth. That is, a value, other than 0, is obtained as the sum of the offset by disturbance. Accordingly, the corrective offset calculated by Equation 1 is obtained.

In the correcting of the measurement angle by using the calculated corrective offset (S30), and the estimating of the frequency based on the result value calculated in operation S30 (S40), the measurement angle of each of the teeth 31 is corrected by using the calculated corrective offset, and accuracy in estimating a frequency is improved by using a result value calculated based on the correction.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for pretreating a wheel speed for improving an accuracy in estimating a frequency of the wheel speed in disturbance, comprising:
    a disk coupled to a wheel of a vehicle;
    a tone wheel including a plurality of teeth, wherein the tone wheel is coupled to the disk;
    a hall sensor, wherein the hall sensor is installed in the vehicle such that the hall sensor detects each of the plurality of teeth of the tone wheel, and a measurement angle and an offset of each of the plurality of teeth of the tone wheel, wherein the hall sensor generates a speed signal using a frequency of rotation of the tone wheel based on the angle and the offset of each of the plurality of teeth of the tone wheel, and wherein the hall sensor determines a disturbance based on the angle and the offset of each of the plurality of teeth of the tone wheel;
    a wheel sensor, the wheel sensor detecting the speed signal and the disturbance; and
    a Tire Pressure Monitoring System (TPMS), the TPMS indicting an air pressure of a tire with an improved accuracy in the estimated frequency of the speed signal by correcting a detection error of the wheel sensor caused by the disturbance at the time air pressure of a tire is estimated from the speed signal, wherein the TPMS includes;
        an offset correcting unit, the offset correcting unit calculating a corrective offset and correcting the measurement angle with the calculated corrective offset when a disturbance is detected, the offset correcting unit further adding the calculated corrective offset to the measurement angle; and
        a frequency estimating unit, the frequency estimating unit estimating a frequency of the speed signal generated by the hall sensor based on a result value calculated from the offset correcting unit,
    wherein the offset correcting unit applies the corrective offset to or from the measurement angle of each of the plurality of teeth.

2. The apparatus of claim 1, wherein the corrective offset is calculated by dividing a sum of the offset by the number of the plurality of teeth.

3. A method of pretreating a wheel speed for improving an accuracy in estimating a frequency of the wheel speed in disturbance, comprising the steps of:
    (a) detecting a plurality of teeth of a tone wheel, at a hall sensor, and obtaining a measurement angle including an offset of each of the plurality of teeth, wherein the hall sensor is installed in the vehicle such that the hall sensor detects each of the plurality of teeth of the tone wheel, and a measurement angle and an offset of each of the plurality of teeth of the tone wheel, wherein the hall sensor generates a speed signal using a frequency of rotation of the tone wheel based on the angle and the offset of each of the plurality of teeth of the tone wheel, and wherein the hall sensor determines a disturbance based on the angle and the offset of each of the plurality of teeth of the tone wheel;
(b) detecting a speed signal at a wheel sensor;
(c) calculating a corrective offset at a Tire Pressure Monitoring System (TPMS) when a disturbance is generated;
(d) correcting the measurement angle at the TPMS by using the calculated corrective offset;
(e) estimating a frequency of the speed signal generated by the hall sensor based on a result value calculated in step (c) and (d) at the TPMS;
(f) applying the corrective offset to or from the measurement angle of each of the plurality of teeth at the TPMS, and
(g) notifying, at the TPMS, a driver of an air pressure of a tire with an improved accuracy in the estimated frequency of the speed signal by correcting a detection error of the wheel sensor caused by the disturbance at the time air pressure of a tire is estimated from the speed signal.

4. The method of claim 3, wherein the corrective offset is calculated by dividing a sum of the offset by the number of the plurality of teeth.

\* \* \* \* \*